E. L. JINNETT.
Bee Hive.
No. 31,719. Patented March 19, 1861.
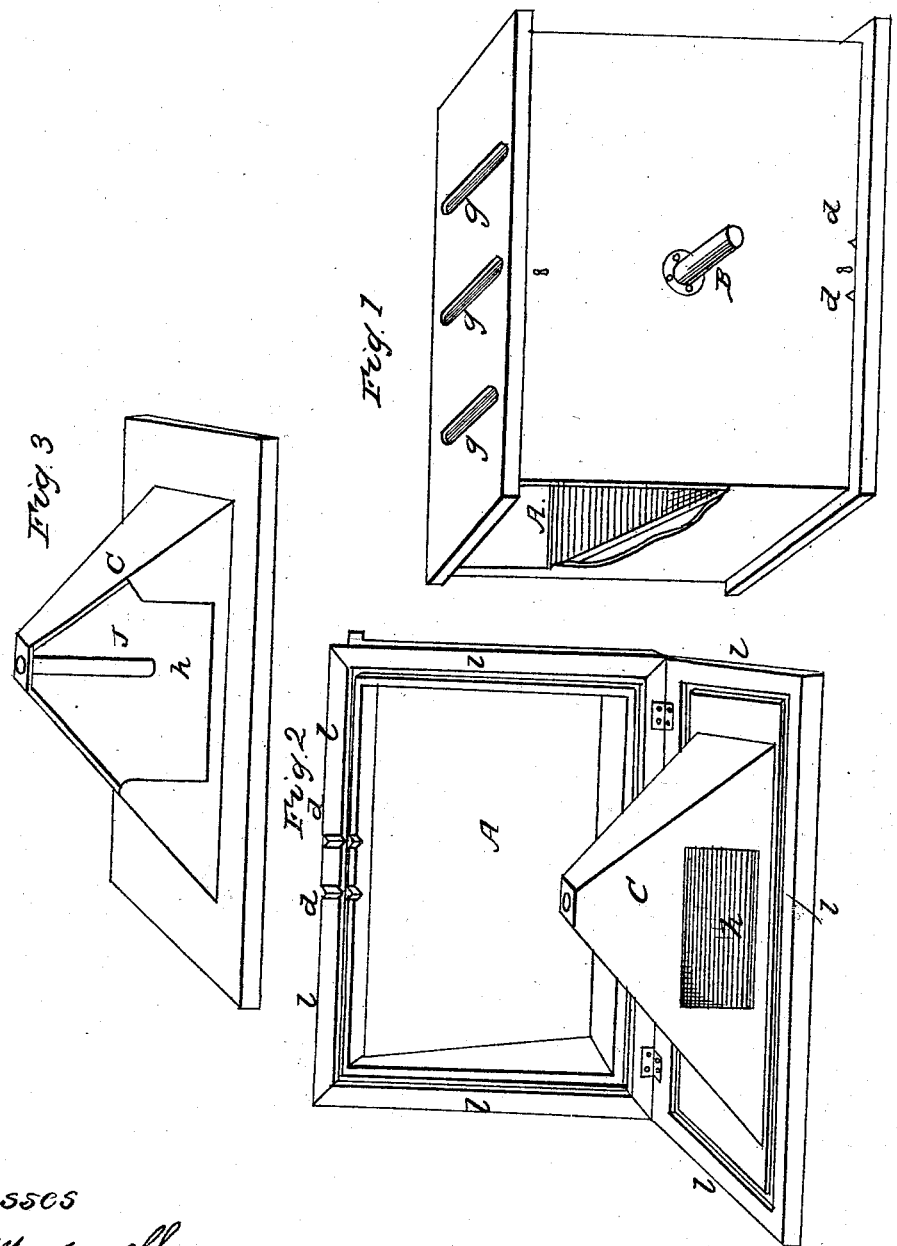
Witnesses
J. H. Maxwell
W. S. Magill
Inventor
Elsberry L. Jinnett

UNITED STATES PATENT OFFICE.

ELSBERRY L. JINNETT, OF VERMILION COUNTY, ILLINOIS.

BEEHIVE.

Specification of Letters Patent No. 31,719, dated March 19, 1861.

*To all whom it may concern:*

Be it known that I, ELSBERRY L. JINNETT, of Vermilion county, in the State of Illinois, have invented a new and useful Improved Beehive and Moth-Destroyer; and I do hereby declare that the following is a full and exact description thereof, reference being had to the accompanying drawings, and to the letters of reference marked thereon.

Figure 1 represents a perspective front view of the hive, with a portion of the right side removed, so as to expose part of the floor of the bee hive. Fig. 2 represents an interior view of the moth hive, with the under side of the floor of the bee hive turned up perpendicularly. Fig. 3 represents the floor and lower portion of the moth hive, with a portion of the front of the pyramidal box, or moth-trap, removed so as to expose the tube extending from the top of the box or trap down through its center.

A. is the floor of the bee-hive, and also the roof of the moth-hive, being made of boards tightly jointed in the large box forming the hive, so as to prevent the passage of all insects from one to the other, and being placed at a sufficient angle or inclined plane from the back downward to the front as to allow the easy passage of dead bees, trash and offal of every description out of the hive through the aperture and tube, B. which is formed of glass, screwed on to the front of the hive covering an aperture through it opposite the front line of the floor, and at a similar angle; said tube forming the only passage for the bees to and from the hive, the same to be of a size to correspond to the size of the hive, and of a length sufficient to ward off the approach of the miller or moth breeder, which seeks a dark place of entrance, and which will therefore avoid the transparent tube.

*g. g. g.* are the doors or apertures communicating from the cap or box above, into which the bees have been hived, and which is then attached to the top of the hive in the ordinary way.

*d. d.* are the doors to the moth hive, being notches cut in the edge of the front of the hive at the bottom where it unites with the floor of the same, which being dark, like the ordinary entrance to the bee hive, will attract the moth breeder thither.

C. is a pyramidal box or moth-trap, attached to the bottom of the moth hive and extending to within an inch or so of the roof, on top of which box is inserted the tube *j*, which tube may be of wood, and extends to near the bottom of the box or trap, said tube forming the only passage into said box or trap.

*l. l. l.* are grooves cut into the floor of the moth hive and into the sections of the hive immediately above, so as to correspond, and of such depth as when shut together to afford a passage for the moth and moth-breeder. In this groove is placed a composition to destroy the moth and the moth egg which may be deposited in it.

*h.* is a pane of glass, forming a window, on the front side of the moth-trap opposite the doors *d. d.* admitting the light from thence to the lower part of the trap, in the bottom of which trap or box is placed the composition to destroy the moth and the eggs that may be deposited therein, the purpose of the window being to attract the moth in its attempt to escape from the trap to the window, and away from the tube which it can only reach by traversing the walls to the top, then descending the tube to the lower end, thus detaining in the trap such moths and insects as may escape the destruction of the composition, till starvation shall have accomplished that result.

Thus it will be seen that by my invention the moth breeder which always seeks a place of darkness to enter and to deposit its egg, is provided with a hive distinct from, and beyond approach to the bee hive, it being accessible only through a transparent glass tube, by which device, because of the penetration of the light, the bees are protected from invasion by the enemy.

Having thus fully explained the construction, use, and operation of my invention, I disclaim all right to a patent on a bee hive with an inclined floor, such hives having long been used; but

What I claim as new, and as my invention, and desire to secure by Letters Patent is—

1. The combination and arrangement of the bee hive, constructed substantially as above described, with a moth hive and trap beneath, attached, provided with the devices above described, or their equivalents of similar construction.

2. The glass tube (B) attached to the bee hive arranged in the manner and for the purposes above described.

ELSBERRY L. JINNETT.

Attest:
D. H. MAXWELL,
W. S. MAGILL.